(12) United States Patent
Chung

(10) Patent No.: US 7,263,181 B2
(45) Date of Patent: Aug. 28, 2007

(54) TELEPHONY SYSTEM AND A METHOD OF OPERATING SAME

(75) Inventor: Hau Leung Stephen Chung, Hong Kong (CN)

(73) Assignee: Intexact Technologies Limited, New Territories (HK)

( * ) Notice: Subject to any disclaimer, the term of this patent is extended or adjusted under 35 U.S.C. 154(b) by 241 days.

(21) Appl. No.: 10/515,169

(22) PCT Filed: Dec. 29, 2003

(86) PCT No.: PCT/CN03/01138

§ 371 (c)(1),
(2), (4) Date: Nov. 22, 2004

(87) PCT Pub. No.: WO2004/077863

PCT Pub. Date: Sep. 10, 2004

(65) Prior Publication Data

US 2005/0213723 A1   Sep. 29, 2005

(30) Foreign Application Priority Data

Feb. 26, 2003   (CN) ............................. 03 1 01425
Aug. 26, 2003   (CN) ............................. 03 1 06116

(51) Int. Cl.
*H04M 3/42* (2006.01)

(52) U.S. Cl. .................... 379/201.06; 379/201.07; 379/201.1; 379/207.12

(58) Field of Classification Search ........... 379/201.06, 379/201.07, 201.1, 207.12, 211.01, 211.02
See application file for complete search history.

(56) References Cited

U.S. PATENT DOCUMENTS 4,313,035 A * 1/1982 Jordan et al. .......... 379/211.02

(Continued)

FOREIGN PATENT DOCUMENTS

EP   0 578 374 A1   1/1994

(Continued)

*Primary Examiner*—Bing Q. Bui
(74) *Attorney, Agent, or Firm*—Buchanan Ingersoll & Rooney PC

(57) ABSTRACT

A telephony system (100) is disclosed as including a number of telephone sets (116a-116f), a home server (110), a fingerprint scanner (102), a keypad (104), a smart card reader (106), and such other identification devices which are adapted to detect the occurrence of location-related events relating to users of the system (100), and the home server (110) is adapted to assess, on the basis of occurrence of the location-related events, the respective probability of the users being in the vicinity of each of the telephone sets (116a-116f). There is also disclosed a method of operating a telephony system (100), including providing a number of telephone sets (116a-116f); providing a home server (110); detecting the occurrence of location-related events relating to users of the system (100 ); and assessing the respective probability of the users being in the vicinity of each of the telephone sets (116a-116f).

14 Claims, 6 Drawing Sheets

U.S. PATENT DOCUMENTS

| | | | |
|---|---|---|---|
| 5,243,645 A * | 9/1993 | Bissell et al. | 379/211.02 |
| 5,533,113 A * | 7/1996 | Ozawa et al. | 379/201.07 |
| 5,548,637 A * | 8/1996 | Heller et al. | 379/201.07 |
| 5,550,907 A * | 8/1996 | Carlsen | 379/211.02 |
| 5,659,596 A * | 8/1997 | Dunn | 455/456.1 |
| 5,689,229 A * | 11/1997 | Chaco et al. | 340/286.07 |
| 5,705,980 A * | 1/1998 | Shapiro | 340/539.11 |
| 5,724,411 A * | 3/1998 | Eisdorfer et al. | 379/93.23 |
| 5,742,233 A * | 4/1998 | Hoffman et al. | 340/573.1 |
| 5,822,418 A | 10/1998 | Yacenda et al. | |
| 5,905,789 A | 5/1999 | Will | |
| 6,125,176 A * | 9/2000 | Foladare et al. | 379/211.02 |
| 6,678,366 B1 * | 1/2004 | Burger et al. | 379/211.03 |
| 6,700,966 B2 * | 3/2004 | Takagi et al. | 379/201.06 |

FOREIGN PATENT DOCUMENTS

| | | |
|---|---|---|
| GB | 2 222 503 | 3/1990 |
| GB | 2 315 191 | 1/1998 |
| WO | 94/23524 | 10/1994 |
| WO | 95/23478 | 8/1995 |
| WO | 01/60033 A1 | 8/2001 |

* cited by examiner

TELEPHONY SYSTEM AND A METHOD OF OPERATING SAME

This invention relates to a telephony system and, in particular, a telephony system capable of determining the possible location of a user of the system and operating the system accordingly, and a method of operating such a telephony system.

Existing telephone systems, e.g. private automatic branch exchanges (PABX's), are designed to manage a number of extensions, leading to telephones or stations installed in different locations of a premise, e.g. a house or an office. The telephones may of course also be located around a wide geographical area. Each extension has a designated extension number. The main task of a traditional PABX system is to connect (or "switch") a caller with a callee to enable a conversation. In order to effect such a switching, the caller has to identify the extension with which connection is desired. The caller may also switch to an "outside line" to connect to the public telephone network.

In such a system, a particular user is usually associated with one, and sometimes more than one, fixed extension number, e.g. the extension of the telephone set of his/her office or room. A caller wishing to connect to a particular callee usually indicates the extension number associated with the callee, e.g. via tone digit presses. The telephone system will then connect the caller to the indicated extension line and rings the telephone set connected with the extension line. If the call is not answered, the caller may decide to hang up or try another fixed extension number, if any, of the callee. Some existing telephone systems can detect when a call has not been answered, e.g. upon ringing of the extension lines for a pre-set number of times, and then offer the caller the choice of leaving a message with the callee's voice mail box, or ask the caller for another extension number to try.

Some such existing PABX systems also include a number of other functions, such as:
  conference call functions, i.e. switching more than two lines together;
  phone books function, so that the user does not have to remember all the telephone numbers, especially those frequently called;
  name lookup function allowing callers to look up extensions of callees;
  quick dial function, usually set for the digits 0 to 9 to reduce the number of key presses for frequently-dialled numbers;
  voice-mail boxes allowing voice messages to be recorded and replayed;
  call re-direction;
  call barring; and
  out-of-office modes.

The telephony features which may be set by a user are usually bound to a particular extension. Some telephony systems allow different extensions to have its own respective personalized feature sets, e.g. speed-dial lists, or phone books. Some systems implement this feature by storing such information in the telephone set connected to that particular extension. Some other systems allow direct entry into a user's voice mail box via the particular user's fixed extension. In this case, if the user wants to access his/her voice mail box from another extension, he/she usually has to specify the voice mail box number. Some other systems allow users to "login" from another extension, to allow the user to use the personalized features from that extension after login.

A very important shortcoming of such existing PABX systems is that they have no knowledge of the location of a user relative to the system, e.g. whether the user is near his/her fixed extensions, or even whether the user is in the premise served by the systems. The existing telephony systems do not know who are using the system and where all the users may possibly be. Sometimes a caller has to try a number of times to track down a callee, e.g. trying different extensions, hoping that one may be answered. Such a problem is particularly acute in an environment, e.g. a house, where most of the extensions are not manned.

It is also a shortcoming of such existing systems that they cannot "personalize" themselves for a particular user's need. As the system has no knowledge of the actual identity of the person using the system from a particular extension, most systems simply assume that the user who is the fixed owner of that extension is the one using the extension at any point of time. This may, or may not, be the case, and in fact such an assumption may cause serious security problems.

Most telephony systems which support personalized features from any extension usually require the user to "login", e.g. by keying in his/her password or user identity (ID) number on the telephone set connected to the extension. Such an exercise is time-consuming, and a user may simply forgets his/her password or user ID number. Even more importantly, if the user forgets to "logout" after use, severe security problems may result.

It is thus an object of the present invention to provide a telephony system in which the aforesaid shortcomings are mitigated, or at least to provide a useful alternative to the public and the trade.

According to a first aspect of the present invention, there is provided a telephony system including a plurality of telephone sets; and at least one data processing apparatus; characterized in including means adapted to detect the occurrence of location-related events relating to at least one user of said system; and said at least one data processing apparatus is adapted to assess, on the basis of occurrence of at least one said location-related event, the respective probability of said at least one user being in the vicinity of each of said plurality of telephone sets.

According to a second aspect of the present invention, there is provided a method of operating a telephony system, including providing a plurality of telephone sets; providing at least one data processing apparatus; detecting the occurrence of location-related events relating to at least one user of said system; and assessing the respective probability of said at least one user being in the vicinity of each of said plurality of telephone sets.

An embodiment of the present invention will now be described, by way of example only, with reference to the accompanying drawings, in which.

Figure 1:
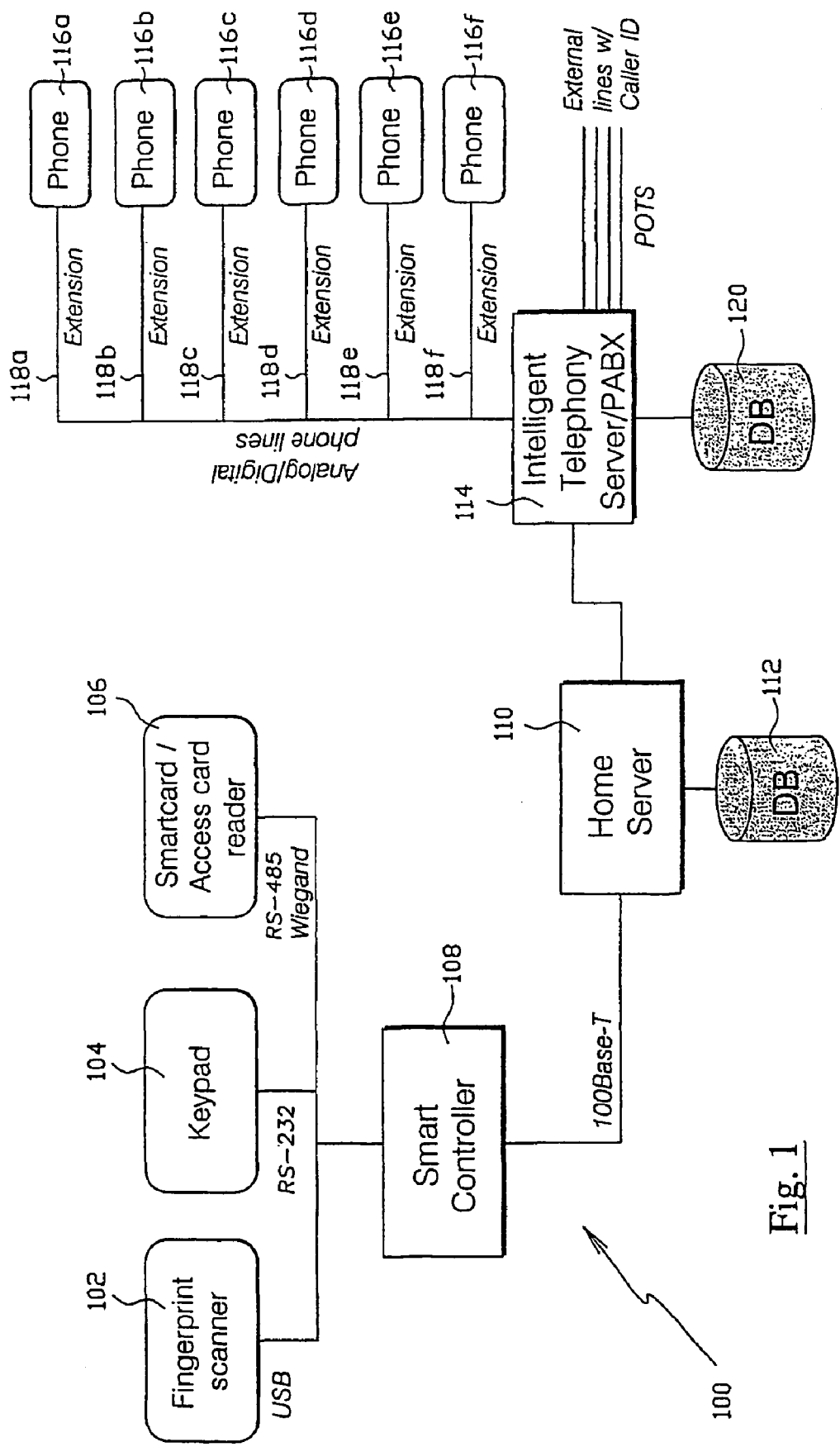
FIG. 1 is a schematic diagram of a telephony system according to the present invention.

Referring firstly to FIG. 1, such shows a schematic diagram of a telephony system according to the present invention, generally designated as 100. In order to enable the telephony system 100 to know or be able to infer the location of the users in the premise or area served by the system 100, there are provided detection devices allowing the system to identify both the users and the respective user's locations. Such detection devices include, in the example shown in FIG. 1, a fingerprint scanner 102, a keypad 104, and a smart card/access card reader 106.

The detection devices are connected with a smart controller 108, The smart controller 108 may be a book-sized form-factor industrial personal computer (PC). In terms of hardware, the PC may include a high-speed central processing unit (CPU), 256 MB of random access memory (RAM), a relatively small (e.g. 20-40 GB) hard disk drive, and a number of hardware devices implemented in the motherboard of the PC, including 100Base-T network, analogue audio input/output, and 3D graphics. In terms of software, the PC may run a version of Microsoft® Embedded XP operating system.

The fingerprint scanner 102 is connected with the smart controller 108 via a universal serial bus (USB), the keypad 104 is connected with the smart controller 108 via a recommended standard-232C (RS-232C) interface, and the smart card/access card reader 106 is connected with the smart controller 108 via an RS-485 interface. Information and/or data captured by the fingerprint scanner 102, the keypad 104, and the smart card/access card reader 106 may thus be transmitted to the smart controller 108. In particular, the fingerprint scanner 102 may read fingerprints of the users, the keypad 104 allows passwords unique to specific users to be entered, and the smart card/access card reader 106 can read personal data and information stored in an integrated circuit (IC) of smart cards. All such devices can identify thus both the identity and location of the specific user.

Fingerprint scanners 102 may be placed in strategic places, e.g. next to the doors of the rooms, around the premise served by the system 100. Keypads 104 and smart card/access card reader 106 may be placed next to access doors. Other appropriate detection devices may also include LCD touch screens and button panels, which allow a user to "log on" in order to signify his/her presence and location.

The smart controller 108 is connected via a 100Base-T interface with a home server 110, which may again be a book-sized form-factor industrial personal computer (PC), as in the case of the smart controller 108 discussed above, although the home server 110 may be of a larger storage capacity and higher processing power than the smart controller 108. In particular, the home server 110 includes a storage device stored with a database 112 of such information and data as set-up parameters, fingerprint images, identity numbers, passwords, etc., of the various users of the system 100

The home server 110 is connected with an intelligent telephony server/PABX 114, which is responsible for routing incoming calls received from external lines with caller identity details via plain old telephone service (POTS) to one or more of telephone sets 116a-116f, via a respective extension line 118a-118f. The intelligent telephony server/PABX 114 is also responsible for routing intercom calls within the system 100. The intelligent telephony server/PABX 114 includes a storage device stored with a database 120 of such information and data as personalized settings, phone books, contact lists, etc.

In this system 100, the smart controller 108, the homer server 110 and the intelligent telephony server/PABX 114 are connected with one another via a central digital communication backbone.

Figure 2:
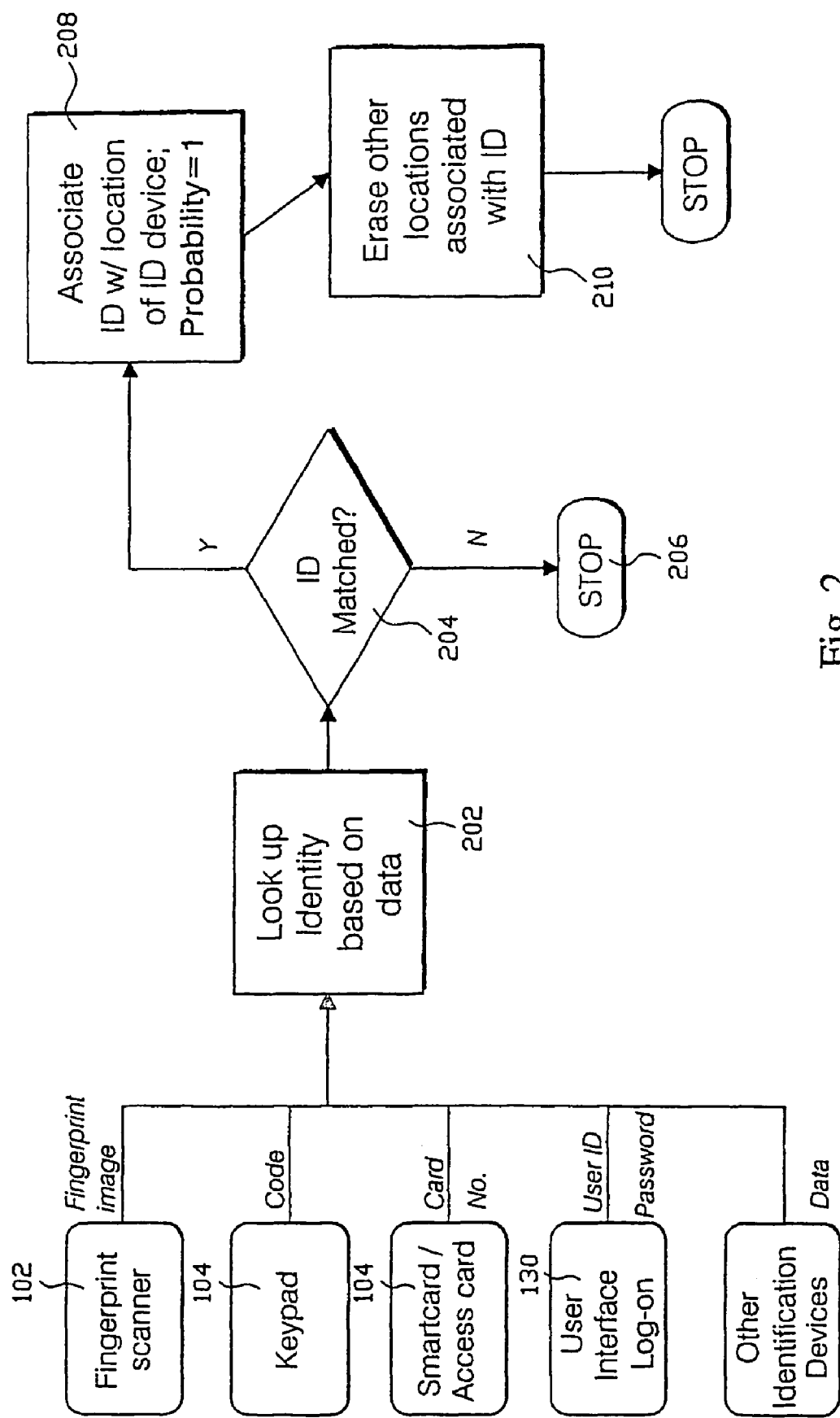
FIG. 2 is a flow chart showing operation of the telephony system shown in FIG. 1 in case of occurrence of a high-probability location-related event.
Figure 3:
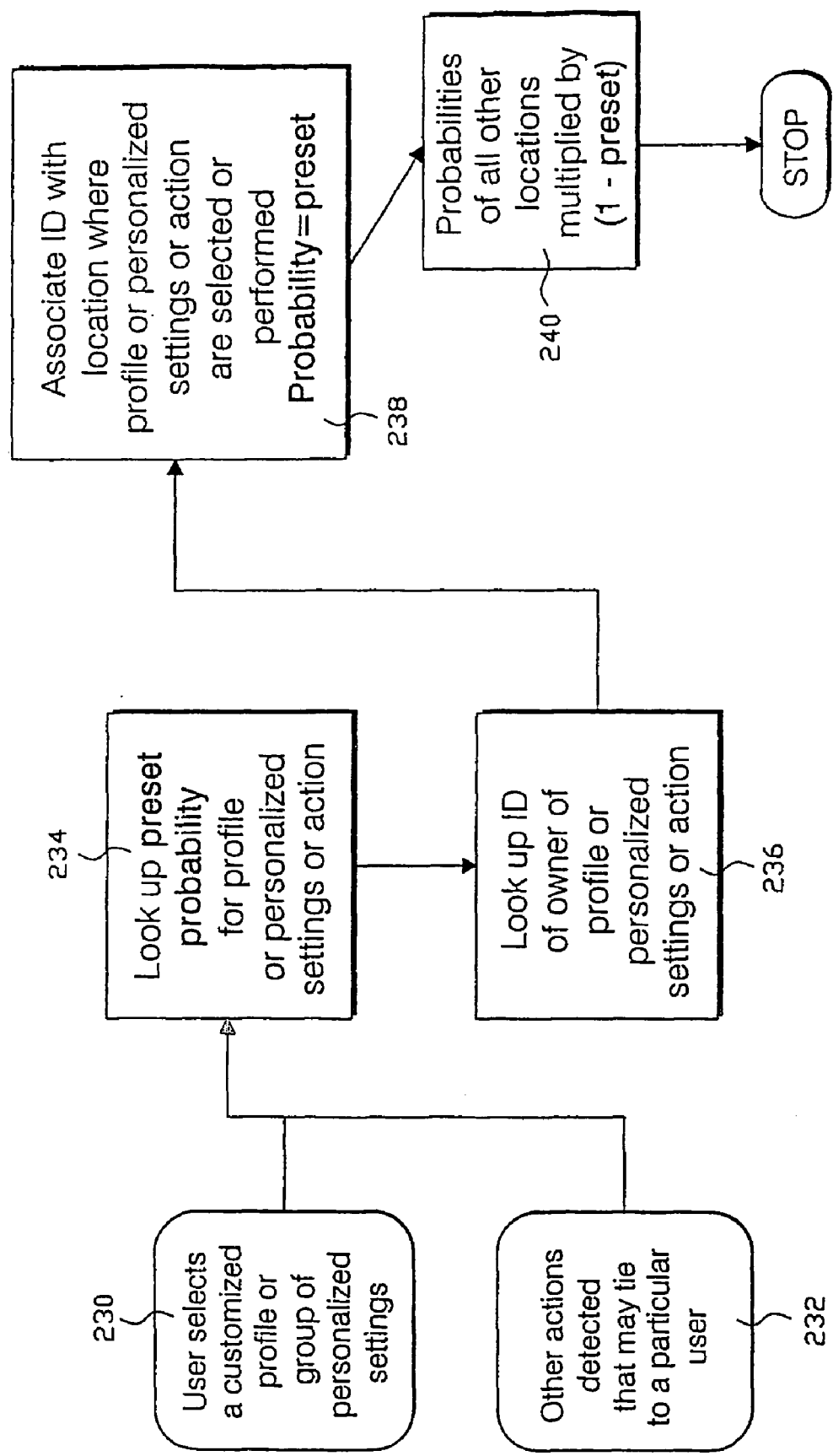
FIG. 3 is a flow chart showing operation of the telephony system shown in FIG. 1 in case of occurrence of a non-high-probability location-related event.

Referring to FIG. 2, if a user, say User A, presses his finger on the fingerprint scanner 102, or enters his identity number in the keypad 104, or has his smart card read by the smart card reader 106 at a specific location, e.g. kitchen, in the premise served by the system 100, or enters his user identification password via a user interface log-on device 130, or indeed identifies his presence and location through interaction with other identification devices installed at the specific location, the system 100 will look up information stored in the database 112 of the home server 110 (Step 202) to check whether the input data match with those stored in the database 112 (Step 204). If the fingerprint image captured by the fingerprint scanner 102 does not match any fingerprint images stored in the database 112, or if the identity number entered into the keypad 104 does not match with any identity numbers stored in the database 112, access may be denied, or the system 100 will not recognize the individual as a valid, e.g. registered, user (Step 206). If, on the other hand, the fingerprint image captured by the fingerprint scanner 102 matches one of the fingerprint images stored in the database 112, both the identity and location of the user will be established, and the system 100 keeps a record of the fact that this particular user is located at the particular location at a certain time, said time being determined by a clock in the system 100.

In the above example, it is thus certain, i.e. with a probability of 1 (or 100%), that the particular user, i.e. User A in the above, scenario, is at that particular location (Step 208), i.e. kitchen in the above scenario, and the probability that the User A is at any other location, e.g. the bedroom or the sitting room, at the same time will thus be 0 (Step 210). The above events relating to the whereabouts of a particular user are of a certainty nature, since it is with certainty that the particular user's identity is established.

There are, however, other events whose occurrence point to a possibility, but not a certainty, that a certain user is at a certain location. The home server 110 is also connected via the central digital communication backbone with various other electrical and/or electronic appliances of the premise, such that the operation of such appliances can be monitored and controlled by the home server 110, as discussed in more detail in the applicant's corresponding Hong Kong short-term patent application No. 03101425.0, the contents of which are incorporated herein for reference purpose. The database 112 of the home server 110 is also stored with details of the personalized settings or customized profiles of the users of the system 100, e.g. as shown in the following exemplary Table 1:

TABLE 1

| Customized Profile | Associated Actions | Associated User | Preset Probability |
|---|---|---|---|
| 1 (Master Bedroom) | a. Opening all the bedroom curtains;<br>b. Turning on the table lamp; and<br>c. Playing the CD player | A | 60% |
| 2 (Entertainment Room) | a. Turning on the TV set;<br>b. Dimming the lights; and<br>c. Setting the air conditioner at a desired temperature of 21° C. | A<br>B | 70%<br>60% |

TABLE 1-continued

| Customized Profile | Associated Actions | Associated User | Preset Probability |
|---|---|---|---|
| 3 (Guest room) | a. Turning on the radio and tuning in to a jazz music channel; and<br>b. Setting the air conditioner at a desired temperature of 21° C. | B | 75% |
| 4 (Master Bedroom) | a. Opening half of the bedroom curtains; and<br>b. Turning on the radio and tuning in to a jazz music channel | B | 60% |

If, therefore, someone selects a certain customized profile (Step 230), e.g. Customized Profile 1, in the bedroom, the system 100 will activate the various electrical and/or electronic appliances to perform the requested functions, i.e. open all the bedroom curtains, turn on the table lamp, and play the CD player, and will look up the above Table 1, to look up the preset probability (Step 234) and the identity of the user associated with the particular customized profile or settings (Step 236), and infer that there is a probability of 60% that User A is in the bedroom (Step 238). As there is no 100% certainty that User A is indeed in the bedroom, the system allows for the possibility that User A may in fact be in another location in the premise. In the above example, the probability that User A is in fact at that time at other locations, e.g. the guest room or entertainment room, will be 1-60%, i.e. 40% (Step 240). Similarly, if at the same time, someone selects Customized Profile 3 in the guest room, the system 100 will determine that there is a probability of 75% that User B is at the guest room. The probability that User B is in fact at that time at other locations will be 1-75%, i.e. 25%. The same assessment of probability of location and identity of the user may also be activated upon occurrence of other actions or events which may have an association with one or more of the users (Step 232). The system is capable of assessing the probability of a number of users being in various locations in the premise served by the system 100.

It should be understood that the probability that ascertain user, say User A, is at a certain location in the premise served by the system 100 may, however, change over time. For example, if, User A's fingerprint image is captured from a fingerprint scanner located in the kitchen at 11:00 am, the probability that User A is at that time in the kitchen will be 100%. It is possible that at 11:15 am, User A's unique password is entered via a keypad in the study, the probability of User A being in the kitchen will fall to 0, whereas the probability of User A being in the study will be 100%. In addition, it is pre-set in the system 100 that, at least for some locations, the probability of a user's presence in that particular location will decrease over time. For example, as it is unusual for a user to stay in the kitchen for over one hour, the probability of a user being in the kitchen may be set to be reduced at a rate of 25% every 15 minutes. Thus, if User A's fingerprint image is captured from a fingerprint scanner located in the kitchen at 11:00 am, and if nothing else happens, the probability that User A is still in the kitchen at 11:15 am will be reduced to 75%, and the probability that User A is still in the kitchen at 11:30 am will be further reduced to 56.25% (i.e. 75%×(1-25%)), and so on.

Figure 4:
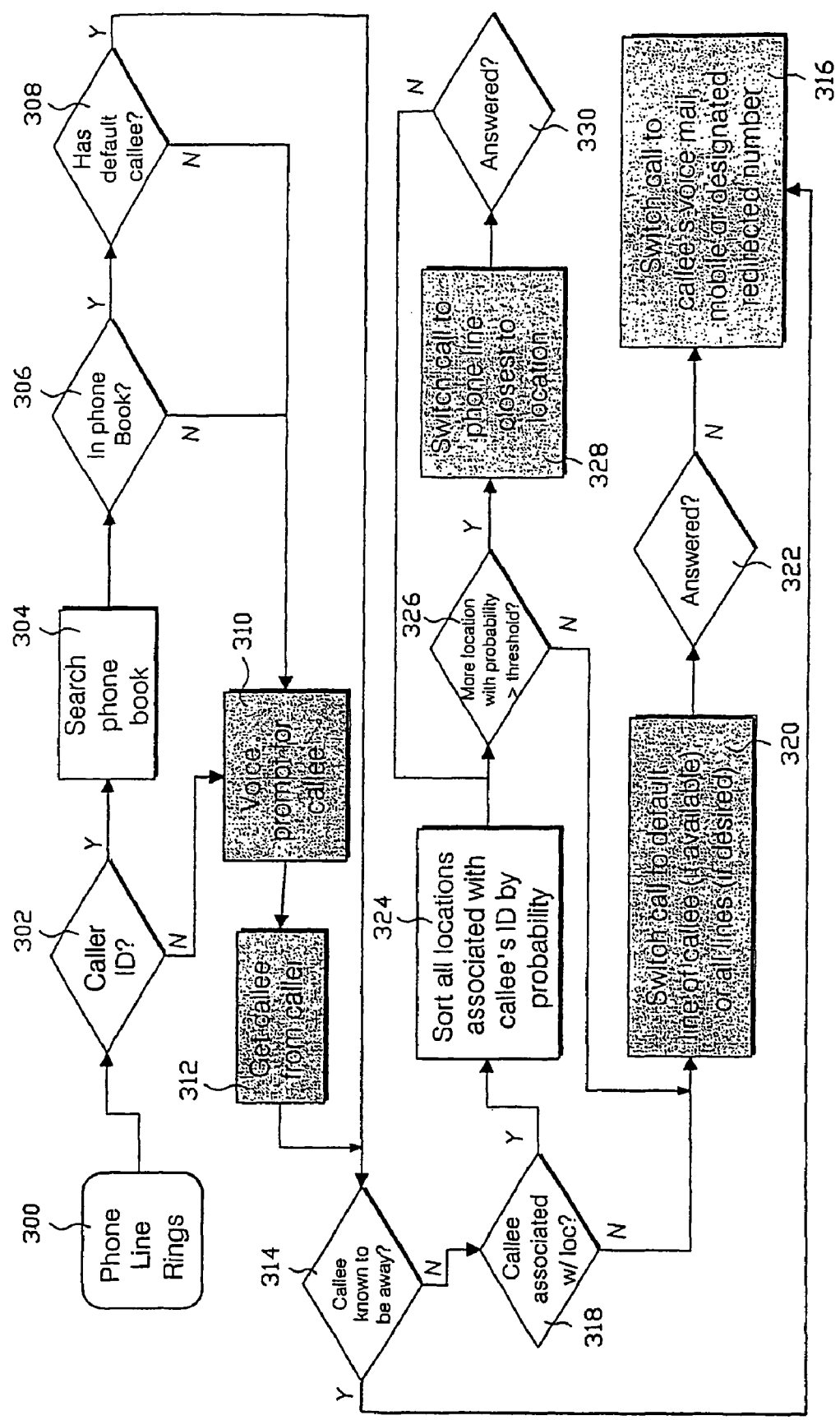
FIG. 4 is a flow chart showing operation of call routing function of the telephony system shown in FIG. 1.

With the above arrangements, it is possible to effect intelligent call routing with the system 100, as shown in FIG. 4. For the ensuing discussion, we take the example that a house installed with the system 100 discussed above includes one master bedroom, one entertainment room, and one guestroom, each with a respective telephone set, and that the house is occupied by two users, namely User A and User B. For the purpose of this example, it is assumed that callers are associated with the respective users as shown in Table 2 below:

TABLE 2

| Caller | Default Callee (User) |
|---|---|
| Uncle Tom | User A |
| John | User A |
| Catherine | User A |
| Grandma | User B |
| Michael | User B |
| Jacky | User B |
| Mr. Chan | — |

When there is an incoming call (Step 300), the system 100 will check if caller identity (ID) details are provided (Step 302). If yes, the system 100 will search the phone book (Step 304) to check if the caller ID matches with the details in the phone book stored in the database 120 (Step 306). Such caller ID details may be the caller's telephone number, or the called number. In the latter case, it is possible to have several outside phone lines connected to the present system 100, each with a different phone number, and a call on a particular phone number may indicate a particular callee. For example, a call on a toll-free phone number may indicate a call intended for the sales receptionist and not the accountant. If details of the caller are in the phone book, the system will then check, e.g. by looking up the exemplary Table 2 above, whether there is a default callee/user associated with the particular caller (Step 308). If no caller ID details are provided (see Step 302), or if the caller is not in the phone book (see Step 306), or if there is no default callee associated with the particular caller (see Step 308), a voice prompt will be generated to obtain the identity of the callee sought to be contacted (Step 310).

Upon receipt of the identity of the callee from the caller (Step 312), or if there is a default callee associated with that particular caller (see Step 308), say if the caller is ascertained to be Uncle Tom, the associated default user is User A, the system 100 will check if the callee, i.e. User A in this case, is known to be away from the premise. A user will be known to be away if, for example, he/she has his/her fingerprint scanned by a fingerprint scanner 102 situated next to the main door. If, say, User A is known to be away from the premise served by the system 100, the line will be switched to User A's voice mail, his mobile phone, or a designated re-directed number (Step 316).

If, on the other hand, User A is not known to be away from the premise, the system 100 will then check if User A is associated with any location (Step 318). This means the system 100, in particular the home server 110, will check to see the probability of User A being in any of the three locations, i.e. the master bedroom, the entertainment room and the guestroom. If User A is not associated with any location, i.e. the system 100 cannot assess or determine the probability of User A being in any of the three locations, incoming call will be routed to a default line of User A, say the extension line leading to the telephone set in the master bedroom, or to all lines, thus ringing all telephone sets in the house (Step 320). If the call is still not answered (Step 322), the line will be switched to User A's voice mail, his mobile phone, or a designated redirected number (Step 316).

If User A is associated with at least one location in the premise, say, in the manner as shown in the following Table 3:

TABLE 3

| Location | Probability of User A's Presence |
|---|---|
| Master Bedroom | 70% |
| Entertainment Room | 20% |
| Guest Room | 10% | the system 100 will sort all such locations by descending order of probability (Step 324). The system 100 will be set a threshold probability level, say 15%, and the probability in Table 3 above will be compared to see if there are any locations with a probability of presence of User A over the threshold level (Step 326). If there is no such location, Steps 320, 322 and possibly Step 316 will be carried out. If, as in the above example, there is at least one location in respect of which the probability of User A's presence is above the threshold level, the incoming call will be switched by the intelligent telephony server/PABX 114 to the phone line leading to the telephone set closest to such a location with the highest probability (Step 328). As in the present example, the incoming call will be switched to the phone line leading to the telephone set in the master bedroom. If the call is not answered, e.g. after having rung five times without the call being answered (Step 330), the system 100 will see if there are other location with a probability of presence of User A over the threshold level (Step 326). In the current example, as the entertainment room fulfills such a requirement, the incoming call will be switched to the phone line leading to the telephone set in the entertainment room. If the call is still not answered, Steps 320, 322 and possibly Step 316 will be carried out.

Figure 5:
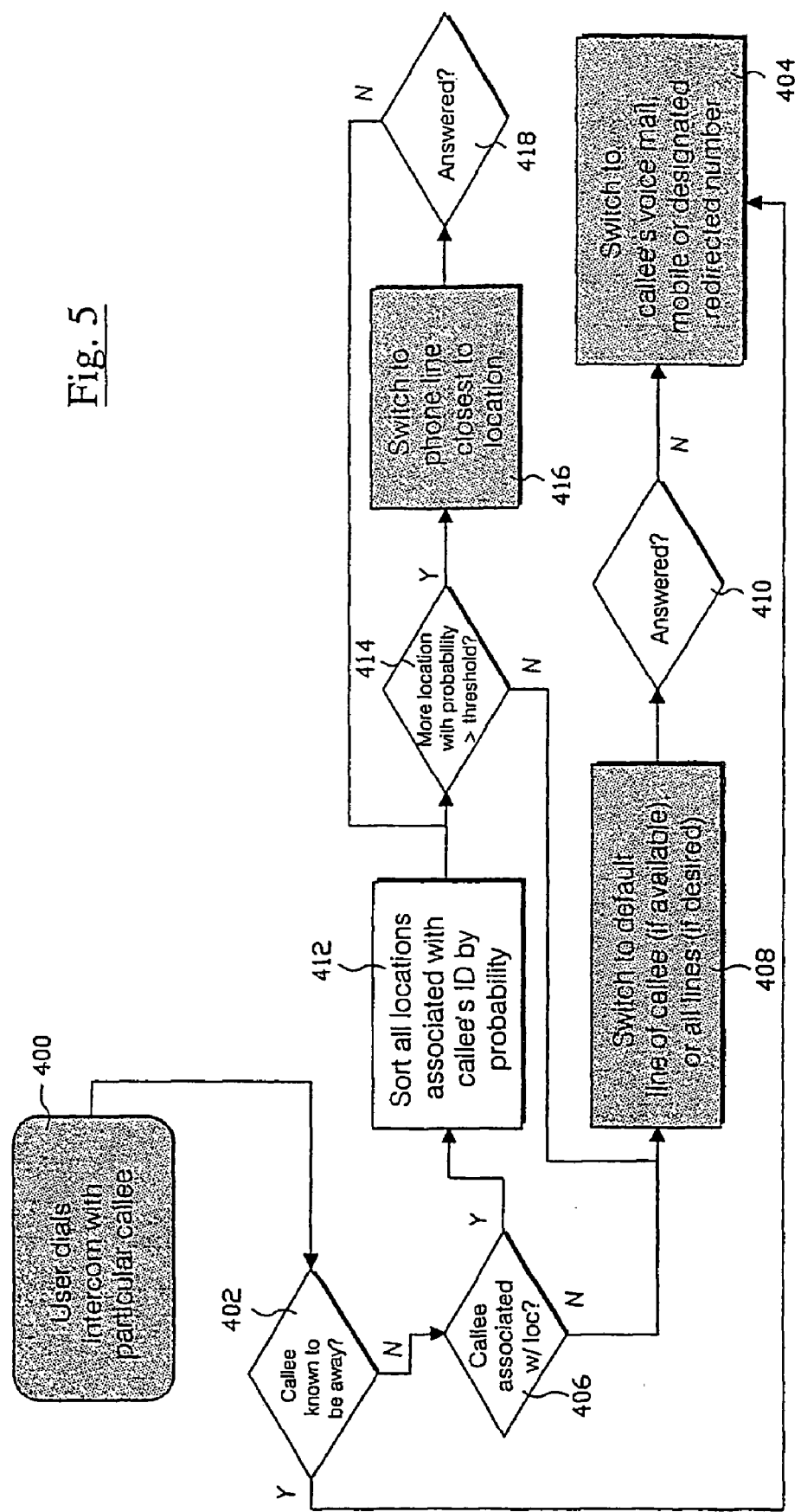
FIG. 5 is a flow chart showing operation of intercom location tracking function of the telephony system shown in FIG. 1.

In a conventional intercom scenario with a traditional PABX system, a caller has to press digit buttons on his/her phone to call extensions within the same PABX system, hoping to locate the intended callee. If the call is not answered, the caller may then try another number or simply wait some time before retry. Now, with the above arrangements, it is also possible to effect intelligent location tracking intecom feature with the system 100, as shown in FIG. 5. In this connection, each user of the system 100 is assigned a unique user number, say 101 for User C and 102 for User D. If, say, User C in his room in an office wishes to contact User D who is believed also to be somewhere in the office at the same time, User C will press digit buttons "102" on her phone to call User D (Step 400). The system 100 will then check to see if User D is known to be away (Step 402). If yes, the line will be switched to User D's voice mail, mobile phone, or a designated re-directed number (Step 404). If, on the other hand, User D is not known to be away, the system 100 will then check if User D is associated with any location (Step 406). This means the system 100, in particular the home server 110, will check to see the probability of User D being in other locations in the office, e.g. the conference room, or the pantry. If User D is not associated with any location, i.e. the system 100 cannot assess or determine the probability of the User D in anywhere in the office, the call will be routed to a default line of User D (if available), or to all lines (if desired), thus ringing all telephone sets in the office (Step 408). If the call is still not answered (Step 410), the line will be switched to User D's voice mail, his mobile phone, or a designated re-directed number (Step 404).

If User D is associated with at least one location in the premise, say, in the manner as shown in the following Table 4:

TABLE 4

| Location | Probability of User D's Presence |
|---|---|
| Pantry | 70% |
| Conference Room | 20% |
| Accounts Department | 10% | the system 100 will sort all such locations by descending order of probability (Step 412). The system 100 will be set a threshold probability level, say 30%, and the probability in Table 4 above will be compared to see if there are any locations with a probability of presence of User D over the threshold level (Step 414). If there is no such location, Steps 408, 410 and possibly Step 404 will be carried out. If, as in the above example, there is at least one location in respect of which the probability of User D's presence is above the threshold level, the intercom call will be switched by the intelligent telephony server/PABX 114 to the phone line leading to the telephone set closest to the location with the highest probability of User D's presence above, which is above the threshold level (Step 416). As in the present example, the intercom call will be switched to the phone line leading to the telephone set in the pantry. If the call is not answered, e.g. after having rung five times without the call being answered (Step 418), the system 100 will see if there are other location with a probability of presence of User D over the threshold level (Step 414). As in the example, there is no other location satisfying such a requirement, Steps 408, 410 and possibly Step 404 will be carried out.

Figure 6:
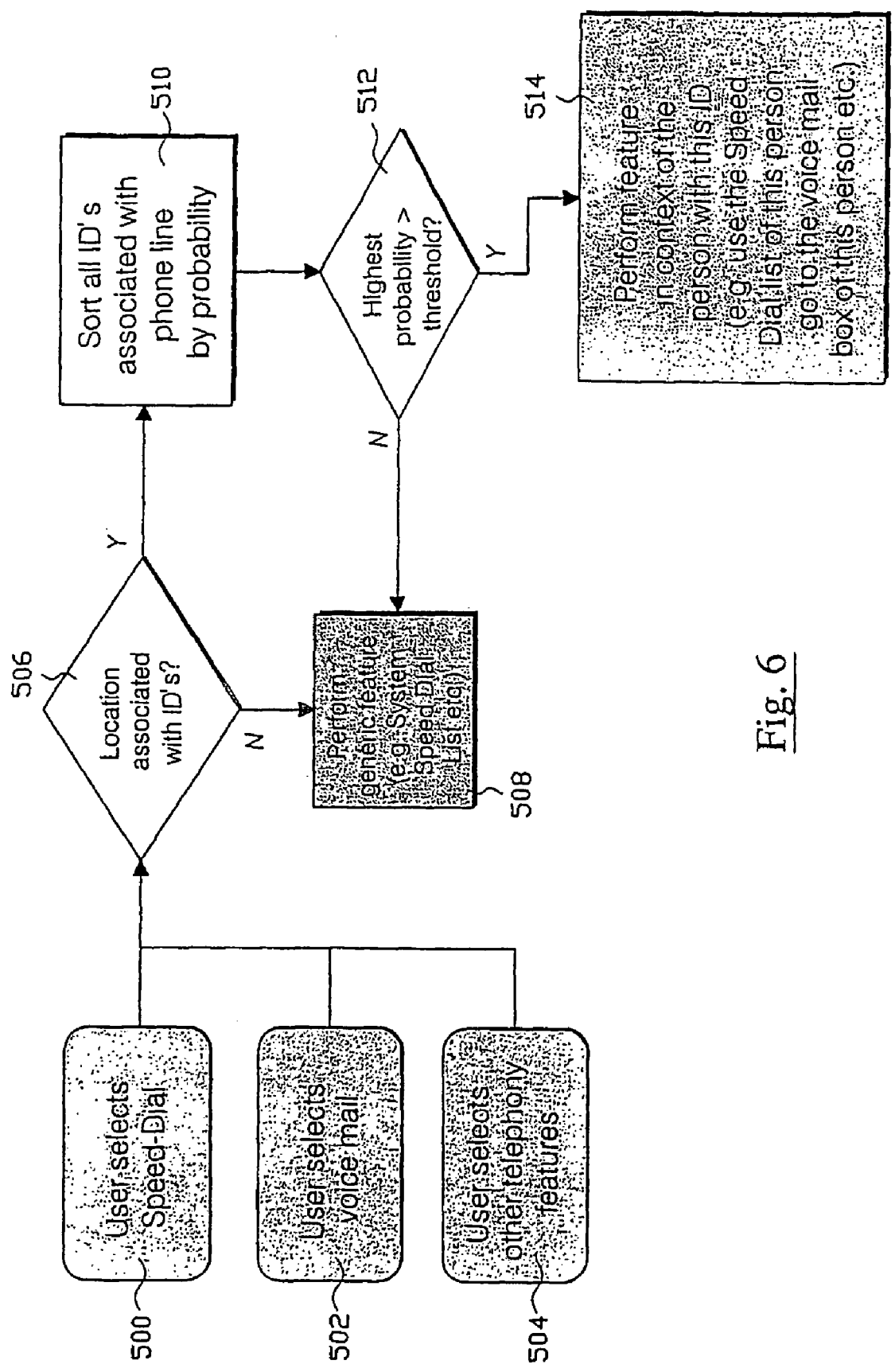
FIG. 6 is a flow chart showing setting of personalized features in the telephony system shown in FIG. 1.

The present arrangement also allows a user to personalize his/her own features set. If certain action is taken on the telephone which has a sufficiently high probability of being associated with a particular user (say scanning of a fingerprint), the system 100 will automatically replace most of the telephony features of the particular telephone set with "personalized" ones. Referring in particular to FIG. 6, if a user selects speed-dial (Step 500), or selects voice mail function (Step 502), or if selects any other telephony features (Step 504) on a certain telephone set, the system 100 will determine the telephone set (116a-116f) which is being acted on and see if any user is associated with the location in which the particular telephone set is situated (Step 506). If there is no known user associated with the particular location, only generic telephony features will be performed (Step 508), e.g. only the system speed dial list will be available.

If, on the other hand, there is at least one user associated with the location in which the telephone set is located, the system 100 will then sort out the users associated with the location in descending order of probability (Step 510). The system 100 will then see if the highest probability exceeds a pre-set threshold, say 80% (Step 512). If not, again only generic telephony features will be performed (Step 508). If, on the other hand, the highest probability exceeds the threshold level, the system 100 will set the particular telephone set to perform telephony features in context of the particular user, e.g.:

phone books and quick dial keys are replaced with the particular user's personalized phone book and quick dial keys;

the particular user's voice mail box and long-distance access are accessible and automatic;
callee list is personalized;
the list of last-dialed numbers is personalized, i.e. listing only the numbers which this particular user has called; and
the list of numbers barred or redirected is personalized.

Thus, if it is assessed that there is a probability of 90% that User E is in the pantry, and a 30% chance that User F is in the entry. If the telephone set in the pantry is used, the system 100 will assume that the user is User E, and the various telephony features, e.g. those mentioned above, will be set in the context of User E accordingly.

It should be understood that the above only illustrates an example whereby the present invention may be carried out, and that various modifications and/or alterations may be made thereto without departing from the spirit of the invention. It should also be understood that various features of the invention which are, for brevity, described here in the context of a single embodiment, may also be provided separately or in any appropriate sub-combinations.

The invention claimed is:

1. A telephony system including:
a plurality of telephone sets;
at least one data processing apparatus; and
means adapted to detect the occurrence of location-related events relating to a plurality of users of said system;
wherein said at least one data processing apparatus is adapted to assess, on the basis of occurrence of said location-related events, the respective probability of at least one of said users being in the vicinity of each of said plurality of telephone sets; and
a data storage means for storing a list of callers, each associated with said at least one of said plurality of users of said system.

2. A system according to claim 1 wherein said detecting means includes fingerprint scanners, keypads, or smart card readers.

3. A system according to claim 1 wherein said detecting means and said at least one data processing apparatus are connected with each other via a central digital communication backbone.

4. A system according to claim 1 wherein upon receipt of a call, said system is adapted to route said call to the telephone set with the highest probability that said at least one user is in its vicinity.

5. A system according to claim 4 wherein said system is adapted to route said call to said plurality of telephone sets successively in accordance with descending order of probability that said at least one user is in their vicinity.

6. A system according to claim 1 wherein said system is adapted to assess the respective probability of each of said plurality of users being in the vicinity of each of said plurality of telephone sets.

7. A method of operating a telephony system, including a plurality of telephone sets, a plurality of users, and at least one data processing apparatus, the method comprising:
detecting the occurrence of location-related events relating to a plurality of users of said system;
assessing the respective probability of at least one of said users being in the vicinity of each of said plurality of telephone sets; and providing a list of caller-related data associated with a plurality of callers, each caller being associated with one of said plurality of users of said system.

8. A method according to claim 7, comprising:
assigning a probability of said at least one user being in the vicinity of each of said plurality of telephone sets to each of said location-related events.

9. A method according to claim 7, comprising:
routing a call to the telephone set with the highest probability that said at least one user is in its vicinity.

10. A method according to claim 7, comprising:
providing a means adapted to detect the occurrence of said location-related events.

11. A method according to claim 7, comprising:
reducing the respective probability of said at least one user being in the vicinity of each of said plurality of telephone sets over time.

12. A method according to claim 7, comprising:
assessing the respective probability of each of said plurality of users being in the vicinity of each of said plurality of telephone sets.

13. A method according to claim 7, comprising: comparing the data of a caller of an incoming call with said list of caller-related data, and determining the probable user of said system being called.

14. A method according to claim 13, comprising: routing said call to said user of said system determined to be the probable user being called.

* * * * *